Dec. 21, 1954     K. A. KENNEDY     2,697,619
QUICK COUPLER
Filed Dec. 19, 1949
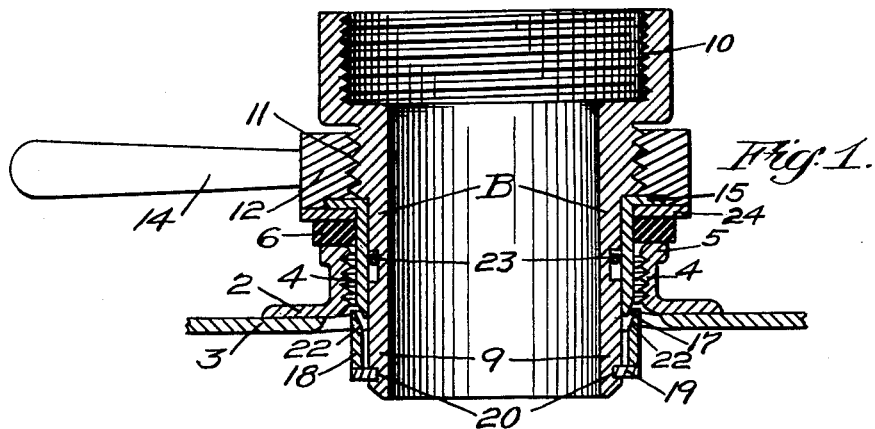
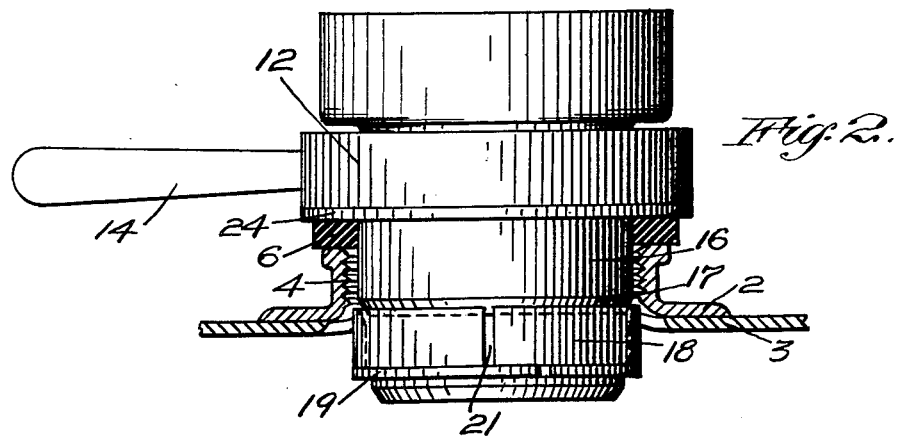
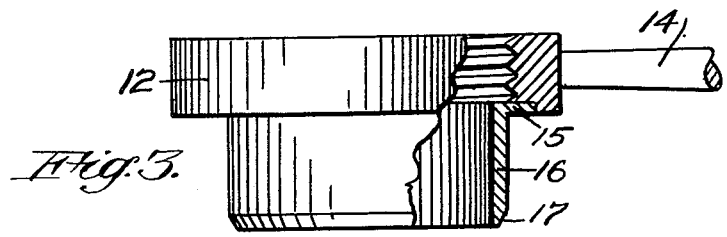
INVENTOR.
K. A. KENNEDY.
BY Thomas Castberg,
Atty.

2,697,619

QUICK COUPLER

Kenneth A. Kennedy, Santa Cruz, Calif.

Application December 19, 1949, Serial No. 133,897

2 Claims. (Cl. 285—47.1)

This invention relates to a coupler for making a quick coupling or connection between the bung or outlet opening of an oil drum and a valve or hose connection to be attached thereto.

A great proportion of the lubricating oil, gasoline, kerosine, solvents etc. produced in this country are contained in and dispensed from fifty-five gallon steel drums and seventy-five percent or more of the drums used in U. S. A. and for export, are equipped with an internally threaded bung opening or outlet to receive a valve, hose connection or other attachment, which is provided with a standard two inch pipe thread. Inasmuch as a drum is emptied and refilled or in other words, used over and over again, the valve or other dispensing device used must be unscrewed and replaced time and again, causing wear between the threads in the bung opening and on the valve, and when wear takes place even though a rubber gasket may be employed, leakage starts and while it may be a slow drip leak, for instance, with a heavy lubricating oil the leakage may be considerable if the valve is applied to a drum containing kerosine or a solvent. The result is waste, oil-soaked floors and obviously a very considerable fire hazard; furthermore, as the threads become worn the spout on the valve when the valve is screwed in tight may point to one side or the other and even in an upward direction making it awkward to dispense the content of the drum, and if the valve is turned back to straighten the nozzle leakage is bound to be considerable. It can also be pointed out that valves and hose connections of this character require the use of a wrench. Wrenches are often misplaced causing loss of time and sometimes a valve is screwed so tight that it is only removed with great difficulty and further loss of time.

The object of the present invention is to provide a coupler whereby a valve, hose connection or other appliance may be readily and quickly applied and secured in the outlet opening of a drum or the like; and further to provide a coupler which does not require the use of a wrench or any other tool, and which when applied forms a rigid connection and positively prevents leakage.

The coupler is shown by way of illustration in the accompanying drawings, in which, Fig. 1 is a central vertical longitudinal section of the coupler showing it inserted in the bung opening of a steel drum or like container.

Fig. 2 is a side elevation of the coupler showing it inserted in the bung opening but showing the bung opening and sealing gasket in section, and Fig. 3 is a side elevation of the nut and the expander secured thereto said view being broken away and being shown partially in section.

The bung opening or outlet with which the greater proportion of steel drums is provided, consists of a short sleeve or collar having a base flange 2 which is welded or otherwise secured to the body 3 of the drum. The sleeve is internally threaded as at 4 and the upper end is provided with an annular flange 5 to support a compressible gasket 6. The coupler forming the subject matter of the present invention makes no use whatsoever of the internal thread 4, even though the coupler is inserted in the threaded opening, nor does the coupler in any way engage or damage the threads as a gripping member hereinafter to be described engages the interior surface at a point below the threads.

The coupler proper consists of a tubular body portion B the lower end 9 of which is inserted in the outlet opening. The upper end is enlarged and is internally threaded as indicated at 10 to receive a valve, hose connection or the like. Formed on the exterior surface of the body member just below the enlarged upper end is a threaded portion 11 and carried thereby is a nut 12 having a handle 14. Secured to the lower face of the nut by a flange 15 is a sleeve like member 16 the lower end of which is tapered as at 17, and disposed below the tapered end is an expandable ring 18 which is supported by a snap ring 19 secured in a groove 20 formed at the lowermost end of the body member.

The sleeve with its tapering end 17 will hereinafter be referred to as the expander, while the expandable ring 18 will be referred to as a gripping member. The gripping member has an interior tapering surface 22 at its upper end complementary to the tapering surface 17, and as the ring 18 or in other words, the gripping member is split in the manner of a piston ring as shown at 21 it will expand circumferentially and its upper end will engage and grip the interior surface of the outlet member at a point just below the threads 4 when the expander 16 is moved downwardly by rotation of nut 12 as will hereinafter be described.

In actual practice the body B may form an integral part of a valve, hose connection or like appliance, or the appliance may be screwed into the coupler to form a part thereof; the threads 10 being provided for that purpose. If a valve having the coupler formed integral therewith or attached thereto is to be applied to a drum, it is only necessary to insert the end 9 of the coupler in the opening of the outlet and to push downwardly until gasket 6 engages the flange 5, then by grasping the handle 14 of the nut and rotating the nut about the body of the coupler in a clockwise direction, nut 12 will move downwardly on the threads 11 and as the expander 16 is secured to the nut it will rotate and move downwardly in unison therewith. The tapering end 17 is thus forced into the upper tapering end of the gripping member or ring 18 and this will expand and grip the interior surface of the outlet opening at a point just below the threads 4. Complete expansion of the gripper takes place when the tapering surface 17 passes below the complementary tapering upper end of the gripping member and this takes place during partial rotation of the nut, in other words, by a partial rotation of the nut the gripping member is first engaged and further or continued rotation will cause compression of the gasket 6 as the coupler as a whole cannot move upwardly after the gripping member has assumed gripping position.

To release or remove the coupler rotation of the nut is reversed, this reverse rotation first releases pressure on gasket 6 and secondly extracts the expander from the gripping member and as this is made of semi spring steel or a like material it will contract the normal position thereby permitting removal of the coupler.

Compression of gasket 6 eliminates any leakage between the exterior surface of the coupler and the annular flange 5 of the outlet opening, however, leakage could take place between the inner surface of the expander and the exterior surface of the body member B and also through the threads of the nut, but this is prevented by use of a packing ring commonly known as an O ring such as indicated at 23. A washer 24 is interposed between nut 12 and gasket 6, this while not absolutely essential, is however desirable as it reduces wear caused by rotation of the nut against the gasket 6.

From the foregoing, it will be noted that by merely inserting the coupler in the bung opening until the gasket 6 seats on the annular flange 5 and then grasping the handle and rotating the nut 12 as previously described, two different operations are consecutively completed, to wit, first the gripping member is expanded to gripping position and secondly the gasket 6 is compressed; the entire operation taking from three to five seconds depending upon the skill or dexterity of different individuals. No time is lost hunting for a wrench or in trying to unscrew a tight valve; the valve when applied will always assume the right position and as there can be no leakage, waste, oil-soaked floors and fire hazard is entirely eliminated, furthermore by employing a comparatively steep pitched thread between the body and the nut 12 the entire operation of actuating the gripping member and compressing the gasket can be accomplished in one-half to three-quarters of a revolution of the nut.

Having thus described my invention, what I desire to claim and secure by Letters Patent is:

1. A quick coupler comprising a tubular body member having one end which is adapted to be inserted in a drum outlet member having an annular flange, said tubular member being open at both ends and when said end portion thereof is inserted in the drum outlet member said tubular body member constituting with the drum outlet member an outlet passage from the drum, a split expandable metallic ring carried by the body member and held thereon against axial movement, said expandable ring being radially movable relative to the body member and engageable when expanded with the interior surface of the drum outlet member, a nut carried by the body member in threaded engagement therewith, a sleeve surrounding the body member and connected to said nut for movement longitudinally therewith, said sleeve having an end portion tapering toward the axis of the sleeve to enter and expand said expandable ring, a compressible gasket surrounding the sleeve and seating on said flange when said end portion of the body member is inserted in the drum outlet member, the rotation of the nut and longitudinal movement of the sleeve first causing the tapering end portion of the sleeve to enter the expandable ring to cause it to expand and grip the interior surface of the drum outlet member and rigidly hold the body member at said end portion thereof to said drum outlet member, and secondly to compress said gasket against the annular flange of the drum outlet member.

2. A quick coupler comprising a tubular body member having one end which is adapted to be inserted in a drum outlet member having an annular flange, said tubular member being open at both ends and when said end portion thereof is inserted in the drum outlet member said tubular body member constituting with the drum outlet member an outlet passage from the drum, a split expandable metallic ring carried by the body member and held thereon against axial movement, said expandable ring being radially movable relative to the body member and engageable when expanded with the interior surface of the drum outlet member, a nut carried by the body member in threaded engagement therewith, a sleeve surrounding the body member and secured to said nut to rotate therewith, said sleeve having an end portion tapering toward the axis of the sleeve to enter and expand said expandable ring, a compressible gasket surrounding the sleeve and seating on said flange when said end portion of the body member is inserted in the drum outlet member, the rotation of the nut and sleeve first causing the tapering end portion of the sleeve to enter the expandable ring to cause it to expand and grip the interior surface of the drum outlet member and rigidly hold the body member at said end portion thereof to said drum outlet member, and secondly to compress said gasket against the annular flange of the drum outlet member.

References Cited in the file of this patent

UNITED STATES PATENTS

| Number | Name | Date |
|---|---|---|
| 491,469 | Carver | Feb. 7, 1893 |
| 708,942 | Torchiani | Sept. 9, 1902 |
| 848,493 | Redenbaugh | Mar. 26, 1907 |
| 998,352 | Kublin | July 18, 1911 |
| 1,273,896 | Martin | July 30, 1918 |
| 2,421,015 | Davidson | May 27, 1947 |
| 2,468,114 | Ruskin | Apr. 26, 1949 |
| 2,481,142 | Mueller et al. | Sept. 6, 1949 |